Dec. 2, 1969  R. A. DOBBS ET AL  3,481,427
ACOUSTICAL PANEL STRUCTURE
Filed Nov. 29, 1968  3 Sheets-Sheet 1

INVENTORS
RICHARD N. HOLMES
RICHARD A. DOBBS
BY Robert O.
Richardson
ATTORNEY

Dec. 2, 1969  R. A. DOBBS ET AL  3,481,427
ACOUSTICAL PANEL STRUCTURE
Filed Nov. 29, 1968  3 Sheets-Sheet 2
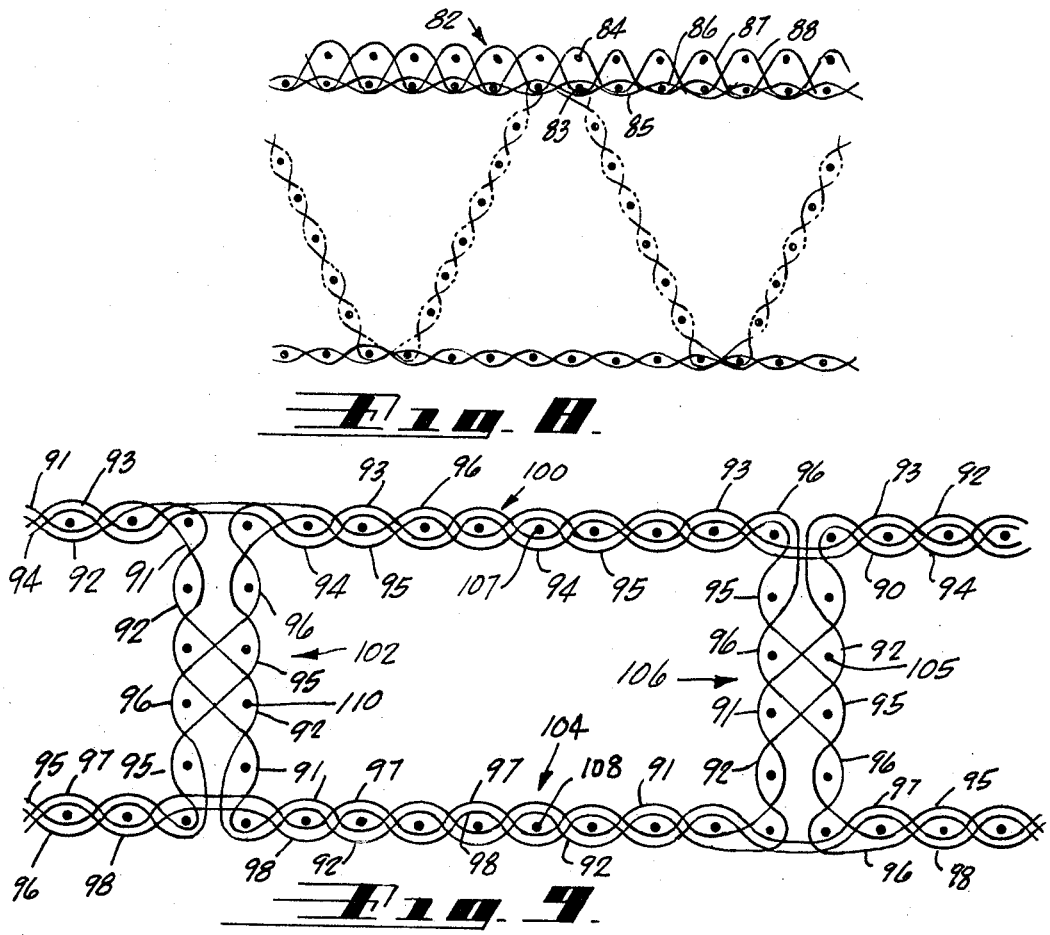
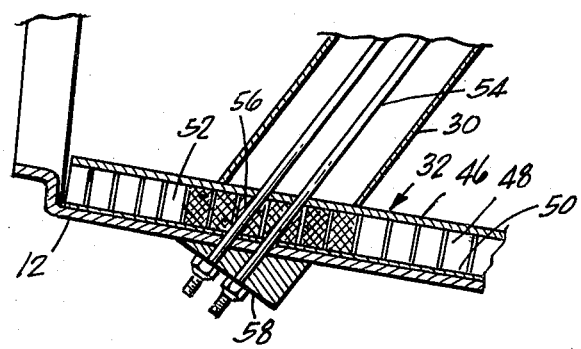
INVENTORS
RICHARD N. HOLMES
RICHARD A. DOBBS
BY
-ATTORNEY- Dec. 2, 1969  R. A. DOBBS ET AL  3,481,427
ACOUSTICAL PANEL STRUCTURE Filed Nov. 29, 1968  3 Sheets-Sheet 3

INVENTORS
RICHARD N. HOLMES
RICHARD A. DOBBS
BY Robert O. Richardson
— ATTORNEY —

3,481,427
Patented Dec. 2, 1969

3,481,427
ACOUSTICAL PANEL STRUCTURE
Richard A. Dobbs, Orange, and Richard N. Holmes, Glendale, Calif., assignors to McDonnell Douglas Corporation, a corporation of Maryland
Filed Nov. 29, 1968, Ser. No. 779,944
Int. Cl. G10k 11/04; E04b 1/99; F01n 1/10
U.S. Cl. 181—33     11 Claims

ABSTRACT OF THE DISCLOSURE

A three-dimensional woven fiberglass fabric impregnated with resin to create a rigid structural panel having suitable openings through which sound wave energy pass to become trapped in channels or cubicles between the opposing faces of the fabric. In one application, the panel is installed as a lining inside the nacelle of a turbofan jet engine.

BACKGROUND OF THE INVENTION

Aircraft and engine manufacturers have been investigating means of reducing aircraft fly-over noise since the development of the first commercial jet transport. The principal noise from turbo jet engines that power these airplanes was that generated by the high velocity jets. Efforts to suppress this noise led to the development of a number of exhaust nozzle designs that reduced the noise by promoting more rapid mixing of the exhaust gases with ambient atmosphere. When the turbofan engine was introduced into commercial service, noise of the fan was so intense that the improvement in exhaust nozzle design had little effect on the total noise generated. In recent years, the problem has been that of restricting noise generated from turbofan powered aircraft. The effect of suppressor designs on aircraft performance and economic characteristics is always a consideration. The turbofan engine has five principal noise sources: fan inlet, fan exit, turbine exit, turbine exhaust jet, and fan exhaust jet, as will be illustrated hereinafter. Noise from the first three sources contain both discrete frequency and broadband noise and is generated within the rotor blade-stator vane assemblies. The latter two named jet noises are broadband in nature and are generated downstream from the engine nacelle through the shearing action of the jet boundary on adjacent slower moving air.

Absorptive duct linings is one concept of reducing noise radiated from the fan inlet and fan exit, which at present is considered to be the most annoying on an aircraft landing approach. One such lining would be layers of fine air permeable fibers or open-cell materials but they appear to have several serious drawbacks in a nacelle environment because of their tendency to absorb and retain fluids and other contaminants. The more practical duct lining, in accordance with the present invention, is of a broadband resonator type having a porous surface and air is confined within the cavities formed by an impervious backing sheet and walls of the supporting core structure. Such linings, however, must have desirable compromise in acoustical absorption and in non-acoustical properties related to cost, productibility, quality control, and serviceability in the nacelle environment. Classes of materials for use within the porous surface include fine meshes of woven metallic and non-metallic fibers and plates with various kinds of perforations.

SUMMARY OF THE PRESENT INVENTION

The present invention utilizes the concept of transmission loss and wave energy absorption in attenuating noise levels. Transmission losses occur by passage of sound waves propagating over a porous surface into still air cavities, resulting in a sound level drop across the porous surface face. Wave energy absorption entraps the sound waves within the absorptive material below the open face.

In accordance with one form of the present invention, a three-dimensional panel is formed from an integrally woven fabric made rigid in a desired configuration by a resin system. This panel has a porous face through which wave energy passes as a sound wave propagates over its surface. A back face and interconnecting ribs complete the panel construction and form a plurality of cavities into which further sound absorbing material may be placed if desired. The ribs may be left impervious or open and may be vertical or angularly disposed. Multiple stacks of fibers may be used in forming a porous face of finite thickness or multiple layers of spaced faces may overlay the air cavities. Various configurations within the cavities may also be used in developing optimum sound absorbing efficiency.

In weaving the three-dimensional panel, fibers are woven using techniques known in the art. However, special face designs are required to give optimum noise reduction. In converting the woven fabric to a rigid state, the fabric is passed through a resin solution in a technique known in the art as preimpregnation and wherein the amount of resin remaining on the fibers is controlled. Thereafter, mandrels are fitted into the panel cells and the panel is cured, and made rigid, under appropriate heat and pressure in a suitably formed mold. After removal of the mandrels, additional sound attenuating materials may be placed in the cavities, if desired.

BRIEF DESCRIPTION OF DRAWINGS

FIG. 2 is a sectional view showing one form of mounting of a panel;

FIGS. 8 and 9 are schematic illustrations of alternate forms of weaving.

DESCRIPTION OF ILLUSTRATIVE EMBODIMENTS

Figure 1:
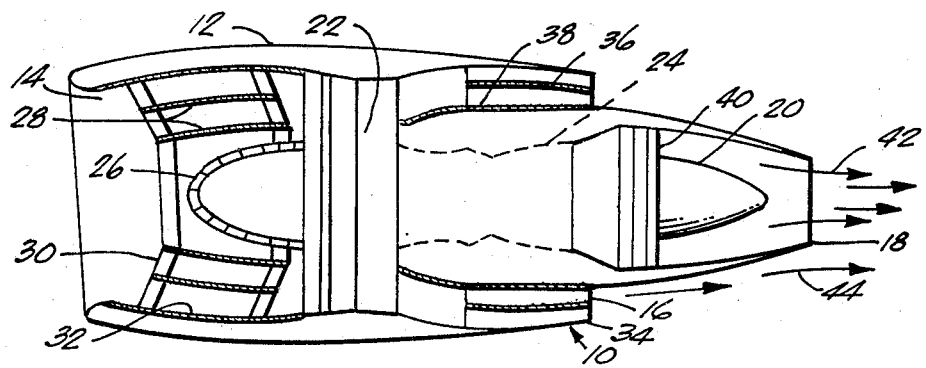
FIGURE 1 is a sectional view of a turbofan jet engine with parts broken away to show placement of sound attentuation panels in its nacelle.

Reference is now made to FIG. 1 wherein there is shown a turbofan engine 10 including its nacelle 12 having an inlet 14, fan exit 16, turbine exhaust nozzle 18, turbine exhaust cone 20 and fan case 22. The engine itself is contained within the dashed lines 24. Within the inlet 14 is shown engine nose bullet 26 and a plurality of concentric vanes 28 positioned by radial vane supports 30. The inner face 32 of the inlet 14 is lined with acoustic sound attenuating panels in accordance with the present invention. The nose bullet 26 also has an acoustic panel thereover and the concentric vanes 28 are also made of the acoustic panel structure. The fan air exhaust duct portion 34 also includes splitter vanes 36 and side walls 38 also have the acoustic paneled surfaces.

The five types of noises previously referred to come from the inlet 14, fan exit 16, turbine exit 40, turbine exhaust jet 42, and fan exhaust jet 44. The panels just mentioned are for the purpose of attenuating noise radiating from the inlet and the fan exhaust duct. In a JT3D engine for the DC-8 aircraft, the sound attenuation panels cover an area of approximately 160 square feet. Since this aircraft has four engines, a total area of 640 square feet is involved. In a prior experimental installation, porous, fibrous metal face sheets were used to fabricate sound attenuating panels. These had an estimated initial production installation cost of $100.00 per square foot, which would result in a total installation cost of the panels of $64,000.00 per aircraft. (Relocation of other structure and equipment caused by sound panel installations and its cost is not included.) Panels made in accordance with the present invention have a cost of about $20.00 per square foot for a total cost of $12,800.00 per aircraft, which is a very substantial saving over that which has been contemplated before.

In FIG. 2 there is shown a typical mounting of the panel 32 on the inner surface of cowling 12 at the inlet. As will hereinafter be explained, the acoustic panel consists of a porous upper face 46, rib core sections 48, and a back face 50 constructed to form a single unit. With the rib cores 48 spaced apart, a plurality of dead air cavities 52 is formed. Certain of these cavities are filled with a solid laminate to provide backup structure in mounting the concentric rings to the cowl shell 12 and radial vane supports 30. Mechanical fasteners 54 extend through the radical vane supports 30, through these solid filled cores 56, and terminate on the other side of the inlet shell 12. In one form of termination, these fasteners are held by a supporting block 58 which is retained in position by a nut and bolt connection at the end of the fastener.

Figure 3:
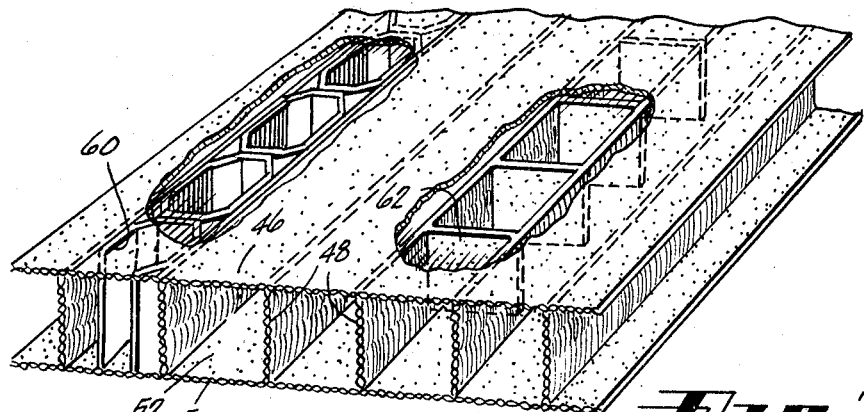
FIG. 3 is a perspective view of a panel having two inner configurations.

Referring now to FIG. 3 there is shown a typical panel section formed by integral three-dimensional weaving, in accordance with the present invention, wherein there is a porous upper surface 46, an impervious back face 50, spaced and interconnected by a plurality of vertical webs 48 to form channels 52. Within these channels may be placed further acoustical blockage in the form of hexagonal core 60 inserted in the channel or by a square cell blockage formed by the insertion of cross members 62. These inserts can be made of fiberglass construction which may be porous or impervious as desired.

The open face sheet 46 is intended to be exposed to the air flow passing thereover and may have additional layers laminated thereto to provide a desired porosity of from 8% to 50% depending upon the acoustical requirements. The velocity of the air flow and the diameter of the fibers in the weave are considerations contributing to the selection of the desired porosity. In one selected application, the fiber strands are glass fibers .017 inch in diameter twisted seven complete turns per inch. The fibers are 90° warp and fill and provide for .080 inch openings.

A preferred contribution to the consistency of flow is that the fibers be twisted approximately seven complete turns per inch. In the present state of the art, the glass fibers, which are of .017 inch diameter, consist of multiple minute fibers in order to give the flexibility required, rather than consisting of one solid fiber of this diameter. With a high twist, the fiber is consistent in cross section instead of irregular shape as is usually found in commercially available fibers, and thus presents a more consistent and uniform flow condition through the porous surface. For this reason, the fibers must be pre-twisted before the weaving operation is performed.

In a typical sound attenuation configuration for the JT3D engine, the channels 52 are typically ¾ inch deep and ¾ inch wide, which is a quarter wavelength of the sound frequency sought to be attenuated. Further information concerning the weaving within these requirements will be more fully set forth hereinafter.

As compared to a configuration of prior art structure wherein the open face was bonded to the vertical core and the open face was metal, tests on sound attenuation panels such as shown in FIG. 3 and fabricated from three-dimensional woven fabric of fiberglass fibers consistently showed a higher decibel (db) sound attenuation than the prior art structures. No other theory or factor can be attributed to this improvement other than the fact a three-dimensional woven fiberglass panel was used. One uncollaborated theory is that sound energy passing over the open face 46 is picked up by the less densely woven fibers and in turn, by its continuity, transferred the energy to the more dense web 48 and into the still continuous fiber and more dense impervious lower face sheet 50. All of the fiber strand is in tune with noise frequencies to give them the maximum attenuation. In a prior art comparison in which a metallic plate or screen is affixed to the top of some vertical webs of identical size as this, the open face attenuates certain frequencies, the vertical core attenuates other frequencies and the bottom face sheet attenuates still other frequencies so that no given frequency is given full attenuation throughout the panel. Surprisingly enough, however, this panel of the present invention attenuates over a broader frequency spectrum than the comparison panel just mentioned.

Figure 4:
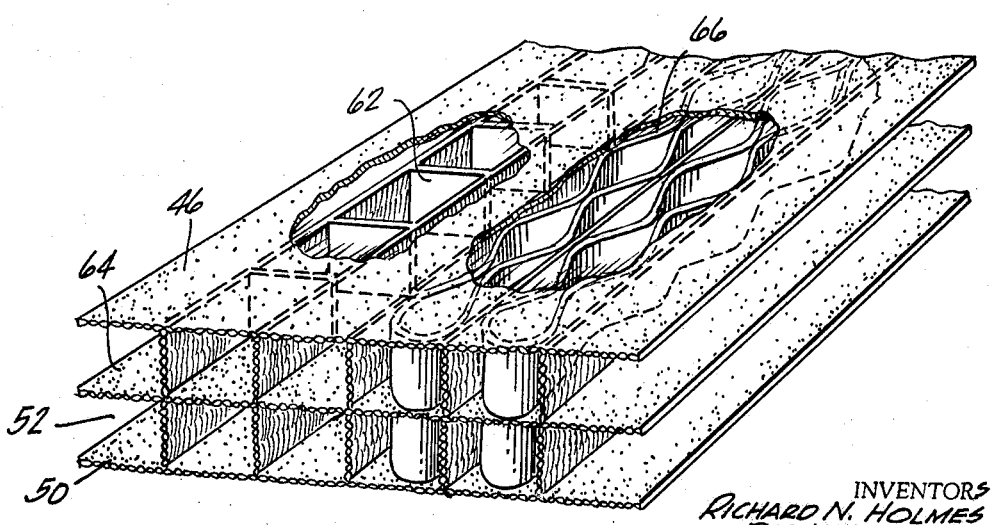
FIG. 4 is a perspective view of a double panel having two inner configurations.

Referring now to FIG. 4, there is shown a double layer integral woven fabric panel which operates on the same principles as the embodiments shown in FIG. 3. In this case, the center layer face sheet 64 is also made porous. Also shown in FIG. 4, instead of hexagonal core or honeycomb 60 in FIG. 3, a sine wave core 66 is used. This core also is preferably of fiberglass construction. Whereas the panel in FIG. 3 resulted in 21 db reduction at the critical landing noise frequency, the configuration in FIG. 4 is capable of about 28 db reduction.

The inserts or acoustical blockage members illustrated at 60 and 62 in FIG. 3, and at 62 and 66 in FIG. 4 can be made of fiber glass construction which may be porous or impervious. However, other types of material, such as ceramics and metals, can be used for this purpose depending upon the acoustical requirements for the panel.

Figure 5:
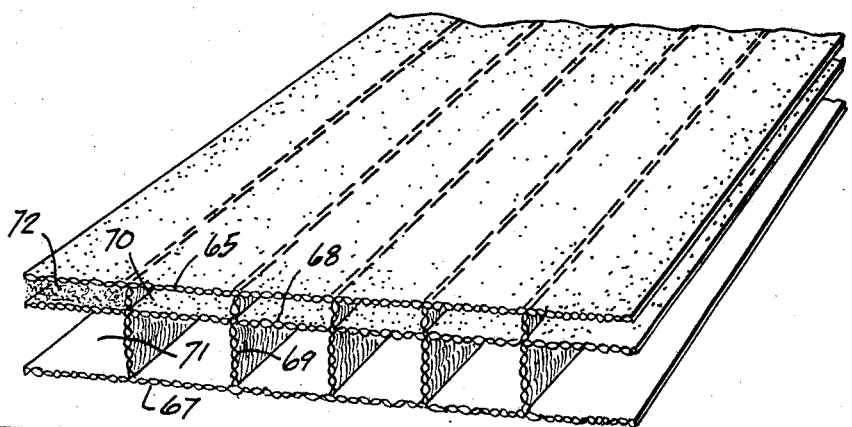
FIGS. 5 and 6 are perspective views of alternate forms of panels.

In FIG. 5 there is an illustratiton of a double-layered acoustic panel consisting of an upper porous face sheet 65, lower impervious sheet 67 and an intermediate porous sheet 68, all spaced apart yet integrally united through a plurality of ribs 69. Upper cavities 70 are thus formed of less depth than the lower cavities 71. A marked improvement in attenuation has been discovered in the use of randomly oriented carbon fibers 72 in the upper cavities 70. Graphite fibers also were observed to display this improvement which is believed to be attributable to the fact that both the carbon and the graphite fibers have an extremely high modulus compared with the glass and metal fibers that have a lower modulus.

Figure 6:
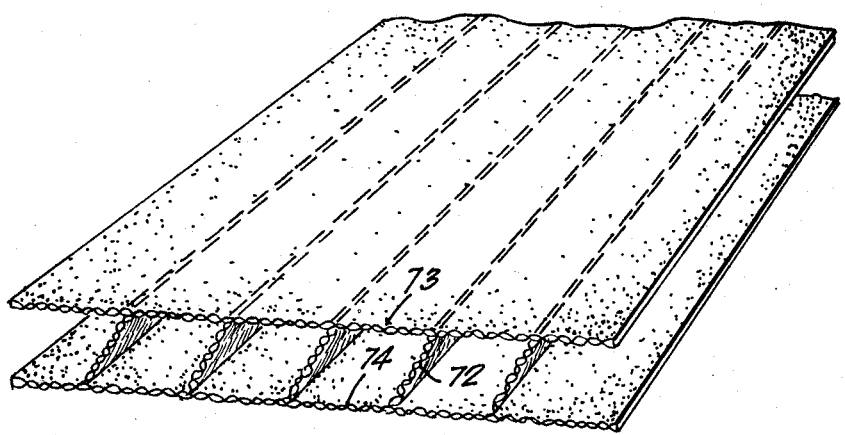

The panel disclosed in FIG. 6 illustrates that the interconnecting webs 72 need not be vertical, but may be angularly oriented. The upper face panel 73 continues to be parallel and spaced from the base or lower face 74, with the interconnecting rib structure 72 inclined at an angle of approximately 60°. This angulation of the ribs permits noise frequency impedance matching with a less thick panel than would be required if the ribs were vertical.

Figure 7:
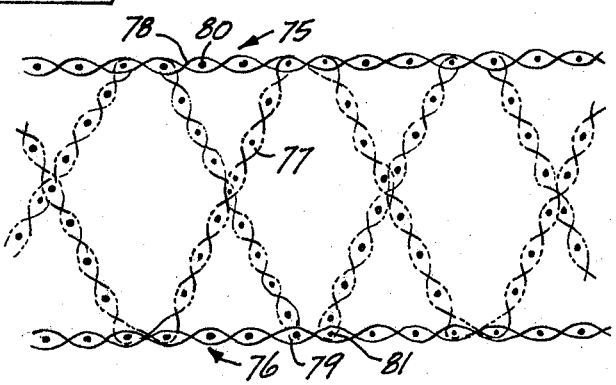
FIG. 7 is a schematic illustration of one form of three-dimensional weave.

In FIG. 7 there is illustrated a three-dimensional woven fabric having a face 75 and back face 76 with an interconnecting rib structure 77 of X-shaped configuration. With this configuration, the sound energy passes through the same number of layers of porous material as, for example, the double layers shown in FIG. 4, except that the thickness of the panel with the FIG. 7 configuration will be considerably less. In this weave there are 14 ends per inch of warp yarns 78 in the top layer 75 and 28 ends per inch of warp yarns 79 in the bottom layer 76. The fill yarns 80 in the top has a density of 14 picks per inch and there are 16 picks per inch of fill yarns 81 in bottom layer 76.

The weave in FIG. 8 provides for a thicker open face 82 which provides a method of controlling the porosity of the open face and with the increased thickness there is greater structural strength in the resulting panel. This is accomplished by using a double row of fill yarns 83, 84 and locking them in place with warp yarns 85, 86, 87 and 88. Those skilled in the art of weaving are readily able to accomplish this as desired for a solid face or where the porosity need not be consistent. Here again, where consistency of porosity is critical, the use of fibers having a high twist appears to lock the fibers into place, creating consistent porosity in the panel face.

The weave pattern shown in FIG. 9 is a conventional weave in the art of making three-dimensional fabric panels. This pattern calls for warp yarns 91 and 92, commencing at the top face 100, to extend down rib 102, across the bottom face 104, up rib 106 and across top face 100 to the next rib. Warp yarns 93 and 94 extend across the top face 100. Similarly, warp yarns 95 and 96, commencing at the bottom face 104, extend up rib 102, across the top face 104, down rib 106 and across bottom face 104 to the next rib, whereas warp yarns 97 and 98 extend across bottom face 104. Fill yarns 105, 107, 108 and 110 simply extend 90° to the warp yarns in the ribs and faces.

Three-dimensional fabrics having particular advantages are integrally woven of glass fibers in accordance with the product and process teachings of Patent Nos. 3,207,185 and 3,090,406. As therein described, a two-layer three-dimensional textile of indefinite length and substantial width may be woven with integral interconnecting woven ribs at spaced positions along its length. The weaves of ribs and the facing layers intermesh, so that each individual yarn successively is a part of the opposite layers and also the different ones of the interconnecting ribs. This essential continuity of the yarns, and unity between the ribs and layers, imparts structural integrity and uniformity. When expanded and rigidified, the woven panel is a unitary three-dimensional piece. For a more complete teaching, reference is made to these patents.

Three-dimensional fabric formed in accordance with these teachings are presently available from Woven Structures, Inc., whose address is 6520 South Alameda Street, Huntington Park, California 90255, who have heretofore applied this knowledge in the fabrication of structural panels having high strength-to-weight ratios and have stressed the use of integrally woven structures of both flat and contoured configurations. These techniques can thus be adapted by those skilled in the art in accordance with the present teachings in the fabrication of acoustic panels having the criteria as set forth herein.

The next step after the fabric has been woven is to form the fabric into the desired contour and make it substantially rigid by resin impregnation. Any suitable resin can be employed for impregnation of the woven cloth for this purpose. Illustrative examples include phenolics, epoxies, polyesters, melamins and polyimides. A preferred class of such resins are the polyimides. One commercially available form of polyimide is the material marketed as Pyralin by DuPont, understood to be a class of aromatic polyimides, the properties of which for impregnation purposes are described in the DuPont Bulletin "Pyralin Polyimide High Temperature Resistant Materials," A–53745 10M, February 1967. Another commercially available satisfactory polyimide is that marketed as "Skybond 700," marketed by Monsanto Chemical Company, properties of which are described in the Technical Bulletin No. 50428 entitled "Skybond 700" of Monsanto.

In an example for impregnating a suitable woven cloth, e.g., as illustrated in FIGS. 7, 8 and 9, the woven cloth is first given an A–1100 finish, i.e., a heat cleaning treatment whereby approximately 72 hours of 600° F. to 700° F. temperature burns off grease, fuzz fragments and other contaminants. This prepares the cloth to accept the resin. The cloth or fabric is then preimpregnated by dipping or passing through a liquid Pyralin (polyimide) resin to approximately 23% by weight of the impregnated material. The liquid impregnating resin can be diluted, if desired, with suitable solvents such as, for example, xylene or solvent mapheta. The above noted ratio of resin to fabric is preferred, but such ratio is variable and may be controlled by squeezing or blotting excess resin from the fabric until the desired weight is achieved. It then is placed in a "B" stage oven where it is heated at about 120° C. for about 75 minutes. This tends to solidify the resin to keep it from flowing.

The preimpregnated cloth material is then converted into a rigid structure of any desired configuration according to the invention, e.g., as illustrated in any of FIGURES 3, 4, 5 and 6. The material is trimmed and cut to approximate size and mandrels are inserted between the vertical webs and face sheets to hold the three-dimensional shape during the cure cycle. The material is then placed over a mold of the desired panel shape and placed in a vacuum bag to hold its shape and to apply correct curing pressures. The panel is then given a first stage cure by heating at the rate of 8° F. per minute to a temperature of 350° F. where it is held for 30 minutes. Thereafter, the panel is removed from the oven, removed from the vacuum bag, the mold and mandrels are removed and the panel is then reheated for a post cure cycle. This cycle involves progressively heating from about 390° F. to about 700° F. over a period of 16 hours. The panel is then ready for trimming and assembly.

We claim:

1. A rigidized three-dimensional woven fabric acoustical panel having a woven upper face of high twist cross fibers to provide openings for the passage of air and sound waves therethrough,
   a rib core structure and a back face, said upper face, said rib core and said back face being joined integrally by weaving into said three-dimensional fabric to form a plurality of air spaces,
   said fabric being impregnated with a resin system to create a rigid structural panel.

2. A woven fabric panel structure as in claim 1 wherein said resin system is a polyimide resin system.

3. A woven fabric panel structure as in claim 2 wherein said resin system comprises approximately 23% by weight of the panel.

4. A woven fabric acoustical panel structure as in claim 1 wherein the porosity of said upper face is 8% to 50% open area.

5. A woven fabric acoustical panel structure as in claim 1 wherein the fibers are approximately .017" diameter and provide approximately .080" openings between adjacent fibers.

6. A woven fabric acoustical panel structure as in claim 1 wherein said channels are approximately ¾" deep and ¾" wide.

7. A woven fabric acoustical panel structure as in claim 6 wherein an acoustical blockage structure is positioned within said channels.

8. A woven fabric acoustical panel structure as in claim 1 wherein said rib core has approximately .040" openings.

9. A woven fabric acoustical panel structure as in claim 1 wherein said fibers are twisted approximately seven complete turns per inch of fiber.

10. A woven fabric acoustical panel structure as in claim 1 wherein said upper face consists of 90° warp and weave fiber of approximately .016" diameter woven to a density of approximately 14 fibers per inch.

11. A jet aircraft engine sound suppression structure comprising:
- a rigidized three-dimensional woven fabric acoustical panel adapted to fit within the nacelle of a turbofan engine, said panel having a woven upper face of cross fibers to provide openings for the passage of air and sound waves therethrough,
- a rib core structure and a back face, said upper face, said rib core and said back face being joined by weaving into said three-dimensional fabric to form a plurality of channels, said fabric being impregnated with a resin system to create a rigid structural panel.

References Cited

UNITED STATES PATENTS

| | | |
|---|---|---|
| 2,477,852 | 8/1949 | Bacon. |
| 2,607,104 | 8/1952 | Foster. |
| 3,011,584 | 12/1961 | Lemmerman et al. |
| 3,090,406 | 5/1963 | Koppelman et al. ___ 139—409 XR |
| 3,166,149 | 1/1965 | Hulse et al. |
| 3,207,185 | 9/1965 | Koppelman et al. ___ 139—304 XR |

ROBERT S. WARD, Jr., Primary Examiner

U.S. Cl. X.R.

181—50